(12) United States Patent
Balus et al.

(10) Patent No.: US 9,077,645 B2
(45) Date of Patent: Jul. 7, 2015

(54) METHOD AND APPARATUS FOR CONTROLLING MULTIPLE REGISTRATION PROTOCOL (MRP) SCOPE USING MRP POLICIES

(75) Inventors: Florin Balus, Cupertino, CA (US);
Xiang-Ling Tan, San Jose, CA (US);
Jeroen Dhollander, Sint-Niklaas (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1241 days.

(21) Appl. No.: 12/966,299

(22) Filed: Dec. 13, 2010

(65) Prior Publication Data

US 2012/0147882 A1 Jun. 14, 2012

(51) Int. Cl.
*H04L 12/813* (2013.01)

(52) U.S. Cl.
CPC ...................................... *H04L 47/20* (2013.01)

(58) Field of Classification Search
None
See application file for complete search history.

(56) References Cited

U.S. PATENT DOCUMENTS

| | | | |
|---|---|---|---|
| 2007/0165626 A1* | 7/2007 | Sultan et al. | 370/389 |
| 2008/0112400 A1* | 5/2008 | Dunbar et al. | 370/360 |
| 2008/0159291 A1* | 7/2008 | Sultan et al. | 370/401 |
| 2009/0037607 A1* | 2/2009 | Farinacci et al. | 709/249 |
| 2009/0190504 A1* | 7/2009 | Finn et al. | 370/256 |
| 2010/0165995 A1* | 7/2010 | Mehta et al. | 370/400 |
| 2010/0226381 A1* | 9/2010 | Mehta et al. | 370/401 |
| 2011/0019678 A1* | 1/2011 | Mehta et al. | 370/401 |

OTHER PUBLICATIONS

IEEE Standard for Local and Metropolitan Area Networks—Virtual Bridged Local Area Networks Amendment 7: Provider Backbone Bridges; IEEE Std 802.1ah-2008; Aug. 14, 2008.
IEEE Standard for Local and Metropolitan Area Networks—Virtual Bridged Local Area Networks Amendment 7: Multiple Registration Protocol; IEEE Std 802.1ak-2007; Jun. 22, 2007.
IEEE Standard for Local and Metropolitan Area Networks—Virtual Bridged Local Area Networks Amendment 4: Provider Bridges; IEEE Std 802.1ad-2005; May 26, 2006.

* cited by examiner

*Primary Examiner* — Ian N Moore
*Assistant Examiner* — Brian T Le
(74) *Attorney, Agent, or Firm* — Wall & Tong, LLP

(57) ABSTRACT

A Multiple Registration Protocol (MRP) advertisement control capability is provided. A method includes receiving an MRP advertisement at a device configured as an interface between a core domain and a local domain and determining handling of the MRP advertisement at the device using at least one MRP policy stored on the device. The core domain may be a Provider Backbone Bridging (PBB) network or other suitable core network. The local domain may be one of a PBB network, a Provider Bridging Network (PBN), a Metropolitan Area Network (MAN), and the like. In one case, when the MRP advertisement is associated with a local service of the local domain, the MRP policy indicates that the MRP advertisement is not to be forwarded via the core domain. In one case, when the MRP advertisement is associated with an inter-domain service supported by the local domain, the MRP policy indicates that the MRP advertisement is to be forwarded to the core domain when received from the local domain and is to be forwarded to the local domain when received from the core domain.

15 Claims, 4 Drawing Sheets

METHOD AND APPARATUS FOR CONTROLLING MULTIPLE REGISTRATION PROTOCOL (MRP) SCOPE USING MRP POLICIES

FIELD OF THE INVENTION

The invention relates generally to communication networks and, more specifically but not exclusively, to controlling the scope of Multiple Registration Protocols (MRPs) within communication networks providing Virtual Private Local Area Network (LAN) Service (VPLS).

BACKGROUND

Multiple Registration Protocol (MRP), which is described in the Institute of Electrical and Electronics Engineers (IEEE) 802.1ak standard, offers support for attribute advertisement in a native Ethernet environment. MRP has many applications, including Multiple Media Access Control (MAC) Registration Protocol (MMRP) for Group MAC registration and Multiple Virtual Local Area Network (VLAN) Registration Protocol (MVRP) for VLAN registration. An MRP application, once enabled, advertises attributes across the network domain(s), thereby consuming resources in every node that runs the protocol. As a result, in a large Service Provider Network, which may be built across different domains (e.g., administrative domains, network types, and the like), running MRP may result in scalability issues, because every node in the network will learn about all of the attributes in the network even though the attribute may only be intended for a subset of the nodes of the network (e.g., for nodes of a particular domain, such as a particular metro network).

SUMMARY

Various deficiencies in the prior art are addressed by embodiments for controlling the scope of Multiple Registration Protocols (MRPs).

In one embodiment, a method includes receiving an MRP advertisement at a device configured as an interface between a core domain and a local domain, and determining handling of the MRP advertisement at the device using at least one MRP policy stored on the device.

In one embodiment, an apparatus includes a processor configured for receiving an MRP advertisement at a device configured as an interface between a core domain and a local domain, and determining handling of the MRP advertisement at the device using at least one MRP policy stored on the device.

In one embodiment, a computer-readable storage medium stores instructions which, when executed by a computer, causes the computer to perform a includes a processor configured for receiving an MRP advertisement at a device configured as an interface between a core domain and a local domain, and determining handling of the MRP advertisement at the device using at least one MRP policy stored on the device.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

A Multiple Registration Protocol (MRP) advertisement control capability is depicted and described herein.

The MRP advertisement control capability provides control over advertisement of MRP attributes using MRP policies. The MRP attribute distribution control capability, by controlling the distribution scope of MRP advertisements, makes MRP more scalable.

The MRP advertisement control capability also may introduce support for end-station behavior on certain ports (and, optionally, related objects such as Attachment Circuits (ACs), Pseudowires (PWs), and the like), thereby enabling co-existence of MRP-enabled domains and statically configured domains.

Although primarily depicted and described herein with respect to use of the MRP advertisement control capability within a specific type of network (e.g., Ethernet) that supports a specific type of service (e.g., Virtual Private Local Area Network (LAN) Services (VPLSs)), it will be appreciated that the MRP advertisement control capability may be used within various other types of networks and/or within networks supporting various other types of services.

Figure 1:
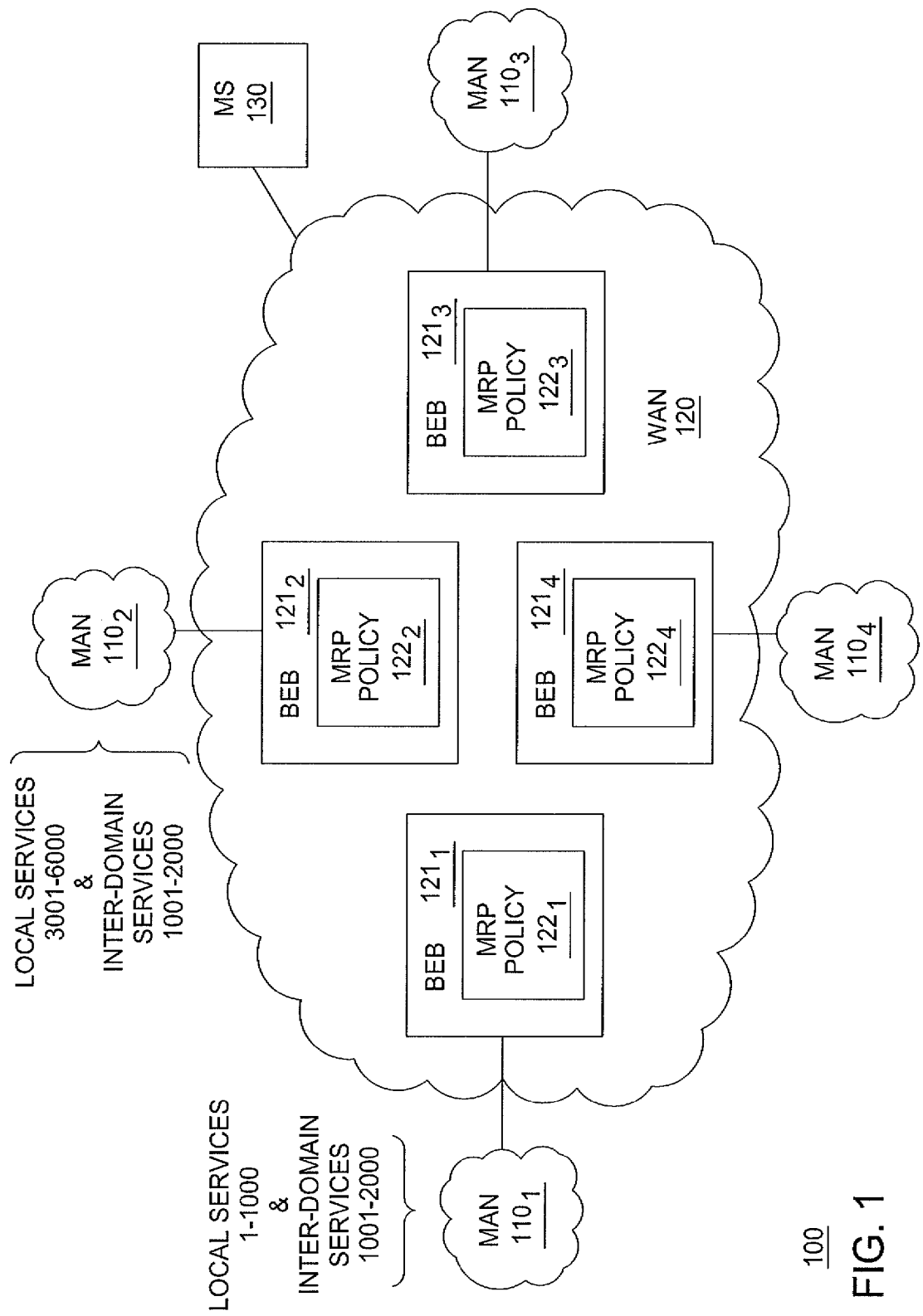
FIG. 1 depicts an exemplary communication system illustrating a multi-domain environment in which multiple local domains are interconnected via a core domain.

FIG. 1 depicts an exemplary communication system illustrating a multi-domain environment in which multiple local domains are interconnected via a core domain.

The exemplary communication system 100 includes a plurality of Metropolitan Area Networks (MANs) $110_1$-$110_4$ (collectively, MANs 110) interconnected via a Wide Area Network (WAN) 120. The exemplary communication system also includes a Management System (MS) 130 configured for managing various aspects of the MANs 110 and/or WAN 120.

The MANs 110 may be implemented using one of more of: (1) Provider Backbone Bridging (PBB) networks, e.g., as described in the IEEE 802.1ah specification, and (2) Provider Bridging Networks (PBNs), e.g., as described in the IEEE 802.1ad specification, each of which is hereby incorporated herein by reference in its entirety.

The MANs 110 may have Backbone VPLS (BVPLS) services configured therein (e.g., where implemented as PBB networks) and/or Customer-Facing VPLS (IVPLS) services configured therein (e.g., where implemented as PBNs) and, thus, may be considered, more generally, to have services configured therein.

Although omitted from FIG. 1 for purposes of clarity, it will be appreciated that each of the MANs 110 may include various edge devices and core devices supporting communications within the MANs 110, respectively (where the types of devices that are deployed within each MAN 110 depends on the type of network of the MAN 110).

The WAN 120 is a backbone network configured for supporting communications between the MANs 110.

The WAN 120 may be implemented as a Provider Backbone Bridging (PBB) network, e.g., as described in the IEEE 802.1ah standard which, as noted hereinabove, is incorporated by reference herein.

The WAN 120 may be implemented as a Multiprotocol Label Switching (MPLS)-based backbone. For example, exemplary communication system 100 may utilize Virtual Private Local Area Network (LAN) Services (VPLS), as defined in RFC 4762 which is hereby incorporated herein by reference in its entirety, which provides a solution for extending Ethernet LAN services, using Multiprotocol Label Switching (MPLS) tunneling capabilities, through a routed MPLS backbone.

The WAN 120 may be referred to as a B-component, and may have an associated BVPLS service configured therein. In one embodiment, WAN 120 supports a BVPLS mesh configuration for supporting communications within WAN 120.

As depicted in FIG. 1, WAN 120 includes a plurality of Backbone Edge Bridges (BEBs) $121_1$-$121_4$ (collectively, BEBs 121). The BEBs $121_1$-$121_4$ operate as points of access, to WAN 120, for MANs $110_1$-$110_4$, respectively. As will be appreciated, each of the BEBs 121 includes a BVPLS instance (and, optionally, an IVPLS instance), one or more interfaces to its respective MAN 110 (e.g., customer facing I-AC interfaces for ACs associated with an IVPLS instance or any other suitable interface(s)), and one or more interfaces to WAN 120 (e.g., backbone B-PW interfaces for PWs associated with a BVPLS instance or any other suitable interface(s)). The typical operation of BEBs 121 will be understood by one skilled in the art, e.g., by way of reference to the IEEE 802.1ah standard.

Although omitted from FIG. 1 for purposes of clarity, it will be appreciated that WAN 120 will include one or more core devices (e.g., Backbone Core Bridges (BCBs)) supporting communications within WAN 110.

Although primarily depicted and described with respect to specific numbers of MANs 110 and associated BEBs 121, it will be appreciated that fewer or more MANs 110 and associated BEBs 121 may be interconnected via WAN 120 (or via any suitable numbers of core networks).

The MS 130 is configured for providing various management functions for exemplary communication network 100. For example, the MS 130 may provide management functions for managing various elements, components, services, and the like. The MS 130 may manage configuration of various network elements of MANs 110, WAN 120, and the like, as well as various combinations thereof. The MS 130 may provide service provisioning functions for provisioning various local and/or inter-domain services within MANs 110. The MS 130 may manage configuration of MRP policies on BEBs 121 of WAN 120. The MS 130 may provide any other suitable management functions which may be provided within the context of such networks. Furthermore, although depicted and described herein with respect to a single management system, it will be appreciated that the management functions depicted and described herein as being performed by MS 130 may be split across any suitable number of systems.

As described herein, each of the MANs 110 supports various services. The services of the MANs 110 may be local services and/or inter-domain services. In general, a local service of a MAN 110 is a service that exists only within that MAN 110 and, thus, does not use communications via WAN 120. In general, an inter-domain service of a MAN 110 is a service that exists within that MAN 110 and one or more other MANs 110 and, thus, which may use communications via WAN 120. In general, each service may have a service identifier associated therewith, which may be represented using any suitable value.

In FIG. 1, exemplary services are depicted for MAN $110_1$ and MAN $110_2$. As depicted in FIG. 1, MAN $110_1$ supports (1) one thousand local services denoted using service identifiers 1-1000 and (2) one thousand inter-domain services denoted using service identifiers 1001-2000. As further depicted in FIG. 1, MAN $110_1$ supports (1) three thousand local services denoted using service identifiers 3001-6000 and (2) one thousand inter-domain services denoted using service identifiers 1001-2000. Although primarily depicted and described with respect to specific numbers of services having specific service identifier values, it will be appreciated that each MAN 110 may support any suitable number of services which may be identified using any suitable service identifier values.

In one embodiment, the exemplary services supported by MANs 110 may be IVPLS services. In one such embodiment, BVPLS service may be configured across all domains (illustratively, the MANs 110 and WAN 120) using the PBB M:1 model in order to provide infrastructure for the multiple IVPLS services of the MANs 110.

As described herein, MRP (e.g., MMRP for Group MAC registration, MVRP for VLAN registration, and the like) is used to support advertising of registration information within the exemplary communication system 100 of FIG. 1. MRP is described in the Institute of Electrical and Electronics Engineers (IEEE) 802.1ak standard, which is hereby incorporated herein by reference in its entirety.

In one embodiment, the MRP advertisement control capability is configured for use in controlling MRP advertising within the exemplary communication system 100 of FIG. 1.

In one embodiment, an MRP policy is applied at a point associated with an interface between a local domain (e.g., one of the MANs 110) and a core domain (e.g., WAN 120) in order to restrict MRP advertisements for the local domain (e.g., controlling propagation of MRP advertisements for local services outside of local domains, controlling propagation of MRP advertisements for inter-domain services from and/or into local domains, and the like, as well as various combinations thereof).

In one embodiment, for example, in multi-domain environments in which a BVPLS spans multiple domains and supports IVPLS services specified by Provider Service Instance Identifiers (ISIDs), an MRP policy can specify one or more of: local ISIDs that are not allowed to be advertised outside of the local domain, inter-domain ISIDs that are allowed to be advertised outside of the local domain, inter-domain ISIDs that are allowed to be advertised within the local domain (e.g., MRP advertisements received via the core domain), and the like, as well as various combinations thereof.

It will be appreciated that similar types of MRP advertising controls may be provided for other types of services (i.e., other than I-Component services) using MRP policies. Thus, descriptions herein to use of MRP policies are primarily provided within the context of more general services, rather than just I-Component Services having associated ISIDs.

The use of MRP policies, by BEBs 121, to provide such control over MRP advertising is described in additional detail with respect to the exemplary services of FIG. 1.

As depicted in FIG. 1, BEBs $121_1$-$121_4$ have a plurality of MRP policies $122_1$-$122_4$ (collectively, MRP policies 122) configured thereon, respectively.

The MRP policy 122 configured on a given BEB 121 associated with a given MAN 110 enables the given BEB 121 to control various aspects of MRP advertisement (e.g., controlling which MRP advertisements originating within the given MAN 110 are allowed to enter WAN 120, controlling which MRP advertisements originating outside of the given MAN 110 and received via the WAN 120 are allowed to enter the given MAN 110, and the like, as well as various combinations thereof).

For example, with respect to $BEB\ 121_1$ associated with $MAN\ 110_1$, $MRP\ policy\ 122_1$ of $BEB\ 121_1$ is configured such that $BEB\ 121_1$: (1) enables only local advertisement, within $MAN\ 110_1$, for services 1-1000, (2) enables inter-domain advertisement, both within and outside of $MAN\ 110_1$, for services 1001-2000, and (3) prevents advertisements for any other services (i.e., other than 1001-2000) from entering $MAN\ 110_1$ from WAN 120. As a result, when MRP advertisements for any of the services 1-1000 are received at $BEB\ 121_1$ from $MAN\ 110_1$, the $BEB\ 121_1$ prevents the MRP advertisements from being propagated into WAN 120, thereby preventing flooding of WAN 120 (and other MANs 110) with MRP advertisements for these services. Similarly, as a result, when MRP advertisements for any of the services 1001-2000 are received at $BEB\ 121_1$ from $MAN\ 110_1$, the $BEB\ 121_1$ allows the MRP advertisements to be propagated into WAN 120 (thereby enabling the MRP advertisements to reach the other MAN(s) 110 supporting those services (illustratively, $MAN\ 110_2$)). Similarly, as a result, when MRP advertisements for any of the services 1001-2000 are received at $BEB\ 121_1$ from WAN 120, the $BEB\ 121_1$ allows the MRP advertisements to be propagated into $MAN\ 110_1$ (thereby enabling the MRP advertisements to be flooded within $MAN\ 110_1$ which also supports these services).

For example, with respect to $BEB\ 121_2$ associated with $MAN\ 110_2$, $MRP\ policy\ 122_2$ of $BEB\ 121_2$ is configured such that $BEB\ 121_2$: (1) enables only local advertisement, within $MAN\ 110_2$, for services 3001-6000, (2) enables inter-domain advertisement, both within and outside of $MAN\ 110_2$, for services 1001-2000, and (3) prevents advertisements for any other services (i.e., other than 1001-2000) from entering $MAN\ 110_2$ from WAN 120. As a result, when MRP advertisements for any of the services 3001-6000 are received at $BEB\ 121_2$ from $MAN\ 110_2$, the $BEB\ 121_2$ prevents the MRP advertisements from being propagated into WAN 120, thereby preventing flooding of WAN 120 (and other MANs 110) with MRP advertisements for these services. Similarly, as a result, when MRP advertisements for any of the services 1001-2000 are received at $BEB\ 121_2$ from $MAN\ 110_2$, the $BEB\ 121_2$ allows the MRP advertisements to be propagated into WAN 120 (thereby enabling the MRP advertisements to reach the other MAN(s) 110 supporting those services (illustratively, $MAN\ 110_1$)). Similarly, as a result, when MRP advertisements for any of the services 1001-2000 are received at $BEB\ 121_2$ from WAN 120, the $BEB\ 121_2$ allows the MRP advertisements to be propagated into $MAN\ 110_2$ (thereby enabling the MRP advertisements to be flooded within $MAN\ 110_2$ which also supports these services).

In this manner, MRP policies provide control over MRP advertising, thereby preventing flooding of MRP advertisements that would otherwise occur in the absence of the MRP advertisement control capability depicted and described herein. For example, in existing multi-domain environments in which a BVPLS spans multiple domains and supports IVPLS services specified by ISIDs, the absence of MRP policies causes MRP advertisements to be flooded throughout the BVPLS context indiscriminately, regardless of the distribution of IVPLS sites. For example, in the absence of MRP policies, MMRP advertises the Group BMACs associated with ISIDs throughout the whole BVPLS context regardless of whether a specific IVPLS is present in one or all of the related edge devices between the specific IVPLS and BVPLS. Furthermore, it will be appreciated that, in the absence of MRP policies, indiscriminate flooding of MRP advertisements will result in various other types of services and networks.

The MRP policies 122 may be implemented in any format suitable for use by the BEBs 121 to use the MRP policies to control MRP advertisements. For example, the MRP policies 122 may be implemented using one or more of programs, filters, templates, and the like, as well as various combinations thereof.

The implementation of MRP policies may be better understood by way of reference to some more specific examples.

In one embodiment, for example, the MRP policy is configured to operate in a manner similar to a filter. For example, the MRP policy may be specified as a template applicable for use with multiple endpoints, on a per-endpoint basis (e.g., for a specific endpoint(s) under an associated "service mrp" object(s)), and the like, as well as various combinations thereof.

In one embodiment, in the case of MMRP, an ISID or a range of ISIDs can be used to specify one or more match criteria that will be used to generate the list of Group MACs to be used as filters to control which MMRP attributes can be advertised. For example, an exemplary MRP policy configured to allow the advertisement of Group BMACs associated with an ISID range 100-150 follows:

```
*A:ALA-7>config>service>mrp# info
----------------------------------------------
   mrp-policy "test" create
       default-action block
       entry 1 create
           match
               isid 100 to 150
           exit
           action allow
       exit
   exit
----------------------------------------------
```

In one embodiment, a special end-station action is available under an entry object of an MRP policy in order to allow emulation on a specific interface of an MMRP end-station (e.g., a AC interface, a PW interface, and the like). This may be used when the operator does not want to activate MRP in the WAN 120 (e.g., for interoperability and/or other reasons), if the operator prefers to manually specify which ISID will be interconnected over the WAN 120, and in other cases. In this case, MRP transmission will be shut down on that interface (e.g., AC, PW, and the like) and the configured ISIDs will be used the same way as an IVPLS connection into the BVPLS, thereby emulating a static entry in the related BVPLS Multicast Forwarding Information Base (MFIB). Additionally, if MRP is active in the BVPLS context, MMRP will declare the related Group BMAC(s) continuously over the other BVPLS interfaces (e.g., AC, PW, and the like) until the special end-station action is removed from the MRP policy assigned to that BVPLS context.

As described herein, the usage of MRP policies by MMRP will ensure that traffic using certain Group BMACs will not be flooded between domains. However, in certain instances, there could be small transitory periods during which traffic that originated from a BEB 121 and having a unicast BMAC destination may be flooded in the BVPLS context, as unknown unicast in the BVPLS context, for both IVPLS and BVPLS services. In one embodiment, in order to restrict distribution of this traffic for local services, a new ISID match criteria is added to existing MAC filters. In this embodiment, a MAC filter configured with ISID match criteria can be applied to the same interconnected endpoint(s) (e.g., ACs, PWs, and the like) as the MRP policy in order to restrict the egress transmission of any type of frame that includes a local ISID. An example of one such MAC filter follows:

```
A;ALA-7>config>filter# info
mac-filter 90 create
    description "filter-wan-man"
    type isid
    scope template
    entry 1 create
        description "drop-local-isids"
        match
            isid from 100 to 1000
        exit
        action drop
    exit
```

In one embodiment, for example, such MAC filters may be applied, as needed or required, on a per B-PW basis just in the egress direction. In this embodiment, various configurations may be used. For example, the ISID match criteria may be exclusive from any other criteria under mac-filter. For example, new mac-filter type attribute may be defined to control the use of ISID match criteria (e.g., being set to "isid" in order to allow the use of ISID match criteria). For example, the ISID tag may be identified using the PBB EtherType value (e.g., which may be provisioned under config>port>ethernet>pbb-etype).

The MRP policies 122 may be configured on the BEBs 121 in any suitable manner. For example, the MRP policies 122 may be pre-provisioned on the BEBs 121 prior to deployment, provisioned on the BEBs 121 by MS 130, and the like, as well as various combinations thereof. For example, the MRP policies 122 may be configured on the BEBs 121 at any suitable time, and may be modified as often as necessary or desired.

The MRP policies 122 may be applied by BEBs 121 at any suitable granularity. Namely, although primarily depicted and described herein with respect to use of a single MRP policy 122 per BEB 121, it will be appreciated that each BEB 121 may be configured with one or more MRP policies which may be applied under various different conditions (e.g., on different interfaces, for different services, and the like, as well as various combinations thereof). For example, one MRP policy 122 may be applied for the BEB 121 (e.g., for each object of the BEB 121 for which the MRP policy 122 is used). For example, multiple MRP policies 122 may be applied at the BEB 121, with each MRP policy 122 being applied to only one object of the BEB 121, with one or more of the MRP policies 122 being applied to multiple objects of the BEB 121 (which may or may not include overlapping use of MRP policies 122 per object), and the like, as well as various combinations thereof. In such embodiments, the objects of the BEB 121 for which the MRP policy or policies may be applied may include any suitable objects (e.g., AC interfaces, PW interfaces, IVPLS instances, BVPLS instances, services, ranges of services, and the like, as well as various combinations thereof). In other words, it will be appreciated that any suitable number of MRP policies 122 may be used on a BEB 121 by applying the MRP policies 122 to any suitable object or objects of the BEB 121 in any suitable arrangement. Thus, MRP policies 122 may be applied by the BEBs 121 at any suitable granularity in terms of the number of MRP policies 122 applied and/or the scope of objects of BEBs 121 for which the MRP policies 122 are applied.

Figure 2:
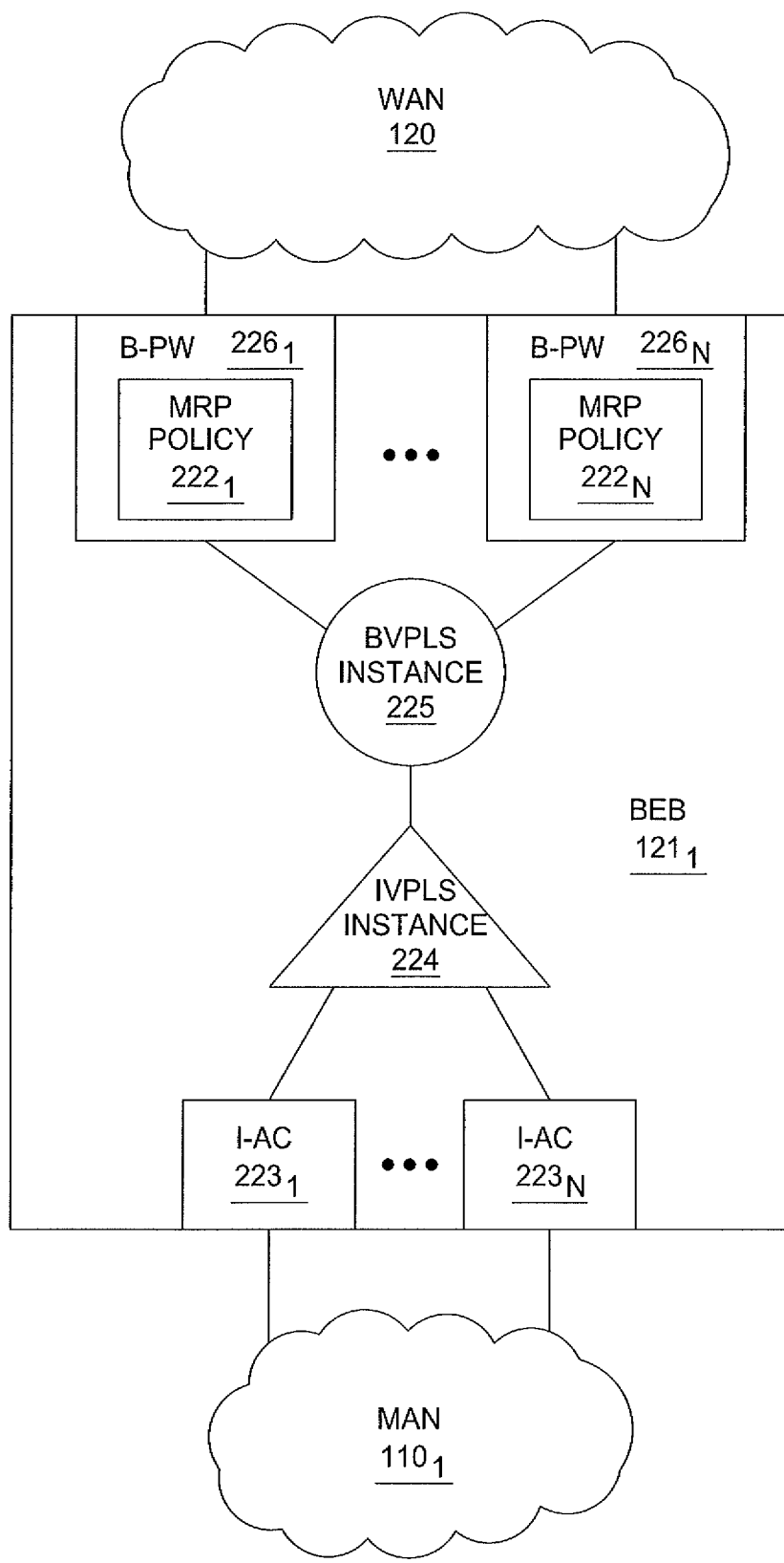
FIG. 2 depicts the exemplary communication system of FIG. 1, illustrating application of MRP policies at an interface between the core domain and one of the local domains.

An exemplary configuration of MRP policies on one of the BEBs 121 of FIG. 1 is depicted and described with respect to FIG. 2.

FIG. 2 depicts the exemplary communication system of FIG. 1, illustrating application of MRP policies at an interface between the core domain and one of the local domains.

As depicted in FIG. 2, a portion 200 of exemplary communication network 100 includes the BEB $121_1$, which is disposed between MAN $110_1$ and WAN 120. As depicted in FIG. 1, BEB $121_1$, although not depicted as such in FIG. 2, may be considered to form part of WAN 120.

The BEB $121_1$ includes a plurality of I-ACs $223_1$-$223_N$ (collectively, I-ACs 223), an IVPLS instance 224, a BVPLS instance 225, and a plurality of B-PWs $226_1$-$226_N$ (collectively, B-PWs 226). The I-ACs 223 provide interfaces to MAN $110_1$ and connect to IVPLS instance 224, the IVPLS instance 224 is connected to I-ACs 223 and BVPLS instance 225, the BVPLS instance 225 is connected to IVPLS instance 224 and the B-PWs 226, and the B-PWs 226 are connected to BVPLS instance 225 and provide interfaces to WAN 120.

In the direction from MAN $110_1$ to WAN 120, frames (e.g., data and control frames) are received by the I-AC(s) 223, provided from the I-ACs 223 to IVPLS instance 224, provided from IVPLS instance 224 to BVPLS instance 225, and provided from BVPLS instance 225 to the appropriate B-PW (s) 226.

In the direction from WAN 120 to MAN $110_1$, frames (e.g., data and control frames) are received by the B-PW(s) 226, provided from the B-PWs 226 to BVPLS instance 225, provided from BVPLS instance 225 to IVPLS instance 224, and provided from IVPLS instance 224 to the appropriate I-AC(s) 223.

As depicted in FIG. 2, BEB $121_1$ includes a plurality of MRP policies $222_1$-$222_N$ (collectively, MRP policies 222) associated with B-PWs $226_1$-$226_N$, respectively. In this manner, each interface between BEB $121_1$ and MAN 110 (illustratively, B-PWs $226_1$-$226_N$) is configured to control handling of MRP advertisements, thereby preventing unnecessary flooding of MRP advertisements within both MAN $110_1$ and WAN 120.

For example, each of the MRP policies 222 may be configured such that, for local services of MAN $110_1$, MRP advertisements originating within MAN $110_1$ that are received by the respective B-PWs 226 are dropped by the B-PWs 226 such that they are not propagated into WAN 120.

For example, each of the MRP policies 222 may be configured such that, for inter-domain services of MAN $110_1$, MRP advertisements originating within MAN $110_1$ that are received by the respective B-PWs 226 are propagated by the B-PWs 226 into WAN 120, such that those MRP advertisements may be transported via WAN 120 and delivered to one or more other MANs 110 supporting the same inter-domain services.

For example, each of the MRP policies 222 may be configured such that, for inter-domain services supported by MAN $110_1$, MRP advertisements received by the respective B-PWs 226 from WAN 120 are propagated by the B-PWs 226 to BVPLS instance 225, such that those MRP advertisements may be provided to MAN $110_1$. Similarly, for example, each of the MRP policies 222 may be configured such that, for inter-domain services not supported by MAN $110_1$, MRP advertisements received by the respective B-PWs 226 from WAN 120 are dropped by the B-PWs 226 such that they are not propagated into MAN $110_1$.

As described herein, it will be appreciated that FIG. 2 represented one embodiment of application of MRP policies at a BEB 121 and that MRP policies may be applied at BEBs 121 in any other suitable manner (e.g., such that the policies are applied at or otherwise associated with BVPLS instance 225, such that the policies are applied at or otherwise associated with IVPLS instance 224, and the like, as well as various combinations thereof).

Figure 3:
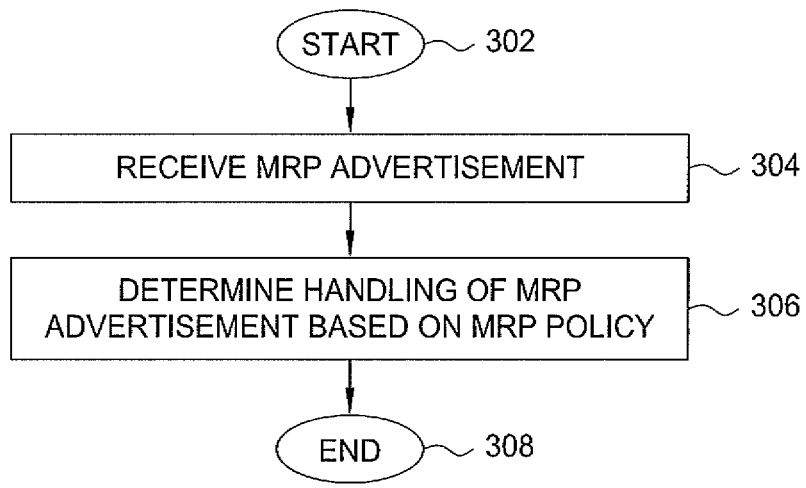
FIG. 3 depicts one embodiment of a method for using an MRP policy to determine handling of an MRP advertisement.

FIG. 3 depicts one embodiment of a method for using an MRP policy to determine handling of an MRP advertisement. At step 302, the method 300 begins. At step 304, an MRP advertisement is received. At step 306, handling of the MRP advertisement is determined based on an MRP policy. The handling of the MRP advertisement may include any suitable actions, such as propagation of the MRP advertisement, dropping of the MRP advertisement, and the like. The handling of the MRP advertisement based on the MRP policy may be performed in any suitable manner. An exemplary embodiment of a method for determining handling of an MRP advertisement based on an MRP policy is depicted and described with respect to FIG. 4. At step 308, method 300 ends.

Figure 4:
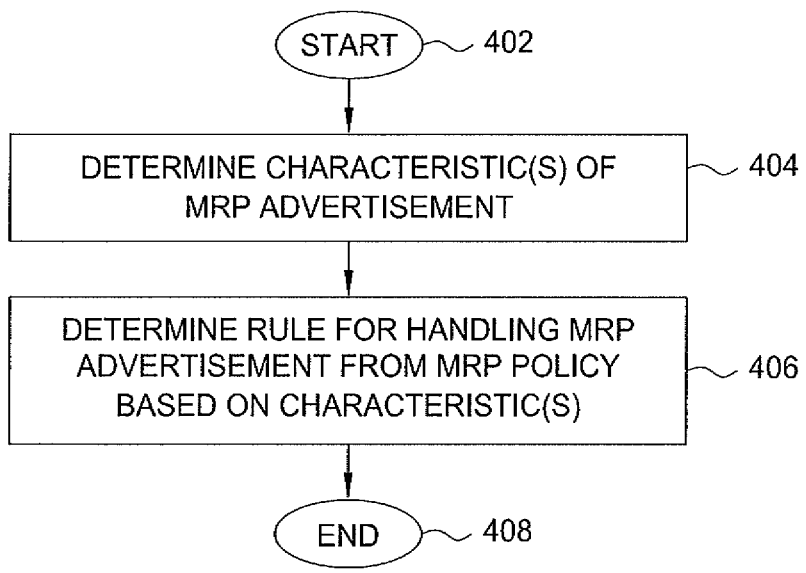
FIG. 4 depicts one embodiment of a method for determining handling of an MRP advertisement based on an MRP policy.

FIG. 4 depicts one embodiment of a method for determining handling of an MRP advertisement based on an MRP policy.

In one embodiment, method 400 of FIG. 4 may be used as step 306 of method 300 of FIG. 3.

At step 402, method 400 begins.

At step 404, at least one characteristic of the received MRP advertisement is determined. The determined characteristic(s) may include a service with which the MRP advertisement is associated (e.g., identified using an ISID value and/or other suitable service identification information), a source and/or destination of the MRP advertisement (e.g., originated within the local MAN, received via the WAN, and the like), and the like, as well as various combinations thereof.

At step 406, a rule for handling the MRP advertisement is determined from the MRP policy based on the determined characteristic(s).

In one embodiment, for example, the ISID value of the service with which the MRP advertisement is associated is used as a key into the MRP policy to identify a rule to be applied for the MRP advertisement based on the service.

In one embodiment, for example, the ISID value of the service with which the MRP advertisement is associated is used, in conjunction with a determination as to whether the MRP advertisement originated in the local domain or was received via the core domain, as a key into the MRP policy, to identify a rule to be applied for the MRP advertisement.

At step 408, method 400 ends.

Although primarily depicted and described with respect to application of MRP policies at specific components of BEBs 121, it will be appreciated that MRP policies may be applied at any other suitable component(s) of BEBs 121. Similarly, although primarily depicted and described with respect to dropping of MRP advertisements being performed by specific components of BEBs 121, it will be appreciated that dropping of MRP advertisements may be performed by any other suitable component(s) of BEBs 121.

Although primarily depicted and described with respect to use of MRP policies on BEBs of a PBB network, it will be appreciated that MRP policies may be used on any other suitable devices, in any other suitable types of network, configured for operating as a gateway between domains of different hierarchical levels (e.g., between a local domain and a core domain or, more generally, between a first domain of a first hierarchical level and a second domain of a second hierarchical level).

Although primarily depicted and described with respect to use of MRP policies to provide control over MRP advertisements in the control plane, in other embodiments MRP policies may be used to provide control over the consumption of resources in the control plane and/or the data plane. As an example, when evaluating the overall scalability of a VPLS network, the resource consumption in the control plane and/or the data plane may be considered as follows: (1) in the control plane, MRP processing and number of attributes advertised may be considered and (2) in the data plane, the number of trees may be instantiated per ISID or Group BMAC attribute may be considered. In one embodiment, for example, scalability of the VPLS control plane is provided by using an MRP policy to limit the scope of MRP control plane advertisements to a specific network domain. In one embodiment, for example, scalability of the VPLS data plane is provided using an MRP policy implemented as an ISID-based filter. In one embodiment, for example, combinations of such MRP policies may be used together for providing scalability in both the control and data planes.

Although primarily depicted and described with respect to use of specific combinations of technologies, it will be appreciated that the MRP advertisement control capability may be provided in other types of network utilizing other types and/or arrangements of technologies.

Figure 5:
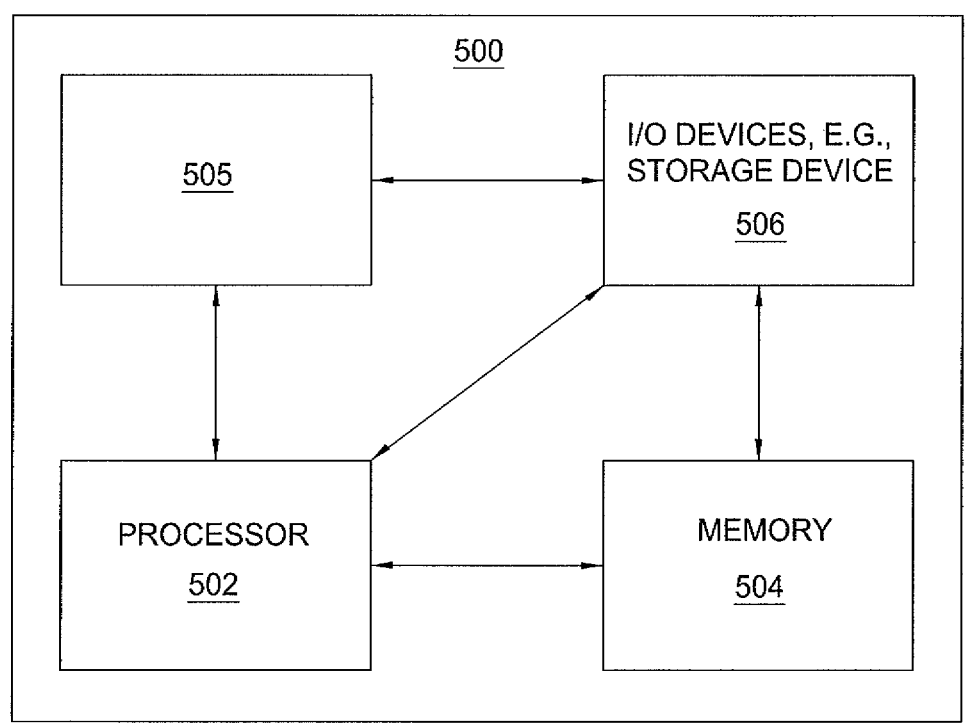
FIG. 5 depicts a high-level block diagram of a computer suitable for use in performing the functions described herein.

FIG. 5 depicts a high-level block diagram of a computer suitable for use in performing functions described herein.

As depicted in FIG. 5, computer 500 includes a processor element 502 (e.g., a central processing unit (CPU) and/or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 505 can be loaded into memory 504 and executed by processor 502 to implement the functions as discussed herein. Thus, cooperating process 505 (including associated data structures) can be stored on a computer readable storage medium, e.g., RAM memory, magnetic or optical drive or diskette, and the like.

It will be appreciated that computer 500 depicted in FIG. 5 provides a general architecture and functionality suitable for implementing functional elements described herein and/or portions of functional elements described herein. For example, the computer 500 provides a general architecture and functionality suitable for implementing one or more of each of the BEBs 121, one or more components or modules of each of the BEBs 121, MS 130, and the like, as well as various combinations thereof.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method, comprising:
    receiving Multiple Registration Protocol (MRP) advertisements at a device configured as an interface between a core domain and a local domain, wherein the device has an MRP policy stored thereon;
    forwarding a first one of the received MRP advertisements between the core domain and the local domain in accordance with the MRP policy indicating that MRP advertisements associated with an inter-domain service of the local domain are to be forwarded between the core domain and the local domain; and
    blocking a second one of the received MRP advertisements from being forwarded via the core domain in accordance with the MRP policy indicating that MRP advertisements associated with a local service of the local domain are not to be forwarded via the core domain;
    wherein the MRP policy comprises a first rule associated with a first service identifier of the local service and a second rule associated with a second service identifier of the inter-domain service.

2. The method of claim 1, wherein the core domain is a Provider Backbone Bridging (PBB) network.

3. The method of claim 1, wherein the local domain is one of a Provider Backbone Bridging (PBB) network, a Provider Bridging Network (PBN), and a Metropolitan Area Network (MAN).

4. The method of claim 1, wherein the MRP policy comprises a third rule associated with a third service identifier of a service not supported by the local domain.

5. The method of claim 4, wherein the third rule indicates that MRP advertisements associated with the third service identifier of the service not supported by the local domain are not to be forwarded within the local domain.

6. An apparatus, comprising:
    a processor configured for:
        receiving Multiple Registration Protocol (MRP) advertisements at a device configured as an interface between a core domain and a local domain,
    wherein the device has an MRP policy stored thereon;
        forwarding a first one of the received MRP advertisements between the core domain and the local domain in accordance with the MRP policy indicating that MRP advertisements associated with an inter-domain service of the local domain are to be forwarded between the core domain and the local domain; and
        blocking a second one of the received MRP advertisements from being forwarded via the core domain in accordance with the MRP policy indicating that MRP advertisements associated with a local service of the local domain are not to be forwarded via the core domain;
    wherein the MRP policy comprises a first rule associated with a first service identifier of the local service and a second rule associated with a second service identifier of the inter-domain service.

7. The apparatus of claim 6, wherein the core domain is a Provider Backbone Bridging (PBB) network.

8. The apparatus of claim 6, wherein the local domain is one of a Provider Backbone Bridging (PBB) network, a Provider Bridging Network (PBN), and a Metropolitan Area Network (MAN).

9. The apparatus of claim 6, wherein the MRP policy comprises a third rule associated with a third service identifier of a service not supported by the local domain.

10. The apparatus of claim 9, wherein the third rule indicates that MRP advertisements associated with the third service identifier of the service not supported by the local domain are not to be forwarded within the local domain.

11. A non-transitory computer-readable storage medium storing instructions which, when executed by a computer, cause the computer to perform a method, the method comprising:
    receiving Multiple Registration Protocol (MRP) advertisements at a device configured as an interface between a core domain and a local domain, wherein the device has an MRP policy stored thereon;
    forwarding a first one of the received MRP advertisements between the core domain and the local domain in accordance with the MRP policy indicating that MRP advertisements associated with an inter-domain service of the local domain are to be forwarded between the core domain and the local domain; and
    blocking a second one of the received MRP advertisements from being forwarded via the core domain in accordance with the MRP policy indicating that MRP advertisements associated with a local service of the local domain are not to be forwarded via the core domain;
    wherein the MRP policy comprises a first rule associated with a first service identifier of the local service and a second rule associated with a second service identifier of the inter-domain service.

12. The non-transitory computer-readable storage medium of claim 11, wherein the core domain is a Provider Backbone Bridging (PBB) network.

13. The non-transitory computer-readable storage medium of claim 11, wherein the local domain is one of a Provider Backbone Bridging (PBB) network, a Provider Bridging Network (PBN), and a Metropolitan Area Network (MAN).

14. The non-transitory computer-readable storage medium of claim 11, wherein the MRP policy comprises a third rule associated with a third service identifier of a service not supported by the local domain.

15. The non-transitory computer-readable storage medium of claim 14, wherein the third rule indicates that MRP advertisements associated with the third service identifier of the service not supported by the local domain are not to be forwarded within the local domain.

* * * * *